United States Patent [19]
Fujita et al.

[11] Patent Number: 5,689,974
[45] Date of Patent: Nov. 25, 1997

[54] METHOD AND APPARATUS FOR PRE-PURIFICATION FOR AIR CRYOGENIC SEPARATION PLANT

[75] Inventors: Atsushi Fujita; Morimitsu Nakamura, both of Kawasaki, Japan

[73] Assignee: Nippon Sanso Corporation, Tokyo, Japan

[21] Appl. No.: 653,253

[22] Filed: May 24, 1996

[30] Foreign Application Priority Data

May 25, 1995 [JP] Japan ................... 7-126921
May 8, 1996 [JP] Japan ................... 8-113956

[51] Int. Cl.$^6$ ................................................. F25J 3/04
[52] U.S. Cl. ..................................... 62/644; 62/908
[58] Field of Search .............................. 62/641, 642, 644, 62/908

[56] References Cited

U.S. PATENT DOCUMENTS

| | | | |
|---|---|---|---|
| 3,722,226 | 3/1973 | McDermott et al. | 62/908 X |
| 3,866,428 | 2/1975 | Simonet et al. | 62/908 X |
| 4,249,915 | 2/1981 | Sincar et al. | 62/908 X |
| 4,671,813 | 6/1987 | Yoshino | 62/908 X |
| 5,156,657 | 10/1992 | Jain et al. | 62/908 X |
| 5,463,869 | 11/1995 | Kumar et al. | 62/908 X |
| 5,505,050 | 4/1996 | Arriulou et al. | 62/908 X |

*Primary Examiner*—Christopher B. Kilner
*Attorney, Agent, or Firm*—Oblon, Spivak, McClelland, Maier & Neustadt, P.C.

[57] ABSTRACT

The present invention offers a pre-purification method and apparatus for an air cryogenic separation plant for removing water vapor and carbon dioxide from feed air, which is able to operate at high air temperatures without the use of special installations such as pre-cooling equipment or demoisturizers to replace freon refrigerators or water spray cooling columns. One aspect of the present invention is a pre-purification method for an air cryogenic separation plant which continuously purifies feed air using a plurality of reciprocally-used adsorption columns 5a, 5b filled with adsorbents for adsorption removal of water vapor and carbon dioxide from the feed air. The method includes an adsorption step, a depressurization step, a heating step, a cooling step, and a repressurization step, whereof the adsorption step for adsorption removal of impurities is performed by feeding pressurized feed air at a temperature of 10°~45° C. into an adsorption column filled with water adsorbent and carbon dioxide adsorbent arranged respectively in that order from the air entrance, at a superficial velocity of 5~40 cm/s. Another aspect of the present invention is a pre-purification apparatus for an air cryogenic separation plant having adsorption columns 5a, 5b filled with water adsorbent and carbon dioxide adsorbent arranged respectively in that order from the air entrance, wherein the weight ratio of the water adsorbent to the total amount of adsorbents is 0.4~0.7.

16 Claims, 4 Drawing Sheets

METHOD AND APPARATUS FOR PRE-PURIFICATION FOR AIR CRYOGENIC SEPARATION PLANT

BACKGROUND OF THE INVENTION

1. Technical Field of the Invention

The present invention relates to methods and apparatus for pre-purification for air cryogenic separation plants. More specifically, the present invention relates to methods and apparatus for pre-processing for air liquefaction separation plants in order to remove impurities such as water vapor and carbon dioxide contained in feed air, without using freon refrigerators to pre-cool the feed air, in consideration of current social trends which encourage the complete abolishment of specific freons for the purposes of environmental protection.

2. Background Art

When separating air by means of cryogenic liquefaction separation plants, the air must be pre-purified before entering the cryogenic section in order to remove water vapor and carbon dioxide. Among pre-purification methods which are used industrially, there are those which use reversing heat exchangers and those which use adsorption.

The reversing heat exchanger method is a low energy process wherein water vapor and carbon dioxide gas are solidified on a heat transfer surface, then melted and evaporated by a purge gas to be discharged outside of the system. However, the purge gas proportion with respect to the amount of feed air is generally over 50%, and the remnant of carbon dioxide gas in the purified air is also relatively high. Additionally, the method requires large switching valve and check valve boxes which can cause noise pollution and other mechanical problems specific to the process. Consequently, the method using reversing heat exchangers has tended to become less popular in recent years. On the other hand, the development of adsorption technology has led the adsorption method to high product yields and the achievement of highly pure removal of trace impurities. These advances, together with its exceptional operability, have made the adsorption method the current standard. Adsorption methods can be largely divided into two different types by the adsorbent regeneration method, and are selected according to factors such as the running condition of the adsorber and the amount of return gas from the cryogenic separation unit. Generally, the temperature swing adsorption method (hereinbelow referred to as the TSA method) is used when there is less purge gas and a higher product yield is desired, and the pressure swing method (hereinbelow referred to as the PSA method) is used when a relatively large amount of purge gas is available. However, while pre-purification adsorption methods using the PSA method have been proposed in numerous publications, the PSA method has a lower effective adsorption rate than does the TSA method, thereby requiring a larger adsorption column. Additionally, the amount of product obtained per unit power is higher due to the low product yield, so that the PSA method is actually used in industry only rarely, and the TSA method is most often used.

Furthermore, adsorption effects are dependent on temperature, with the adsorption rate being higher when the adsorption temperature is lower. For this reason, in order to perform adsorption operations under advantageous conditions wherein the adsorption rate of adsorbent is relatively high, air from the aftercooler containing saturated water vapor at about 40° C. is further cooled to 5°–10° C. using a freon refrigerator or the like, thereby improving the adsorption conditions and reducing the water content before introduction to the adsorber by performing water separation after cooling. Under these types of air conditions, adsorbers which used the TSA method can continuously remove water vapor and carbon dioxide by switching between an adsorption step and a regeneration step every 4 hours. The heating temperature of the purge gas used for regeneration in this case is approximately 150° C. and the purge gas proportion with respect to the amount of feed air is 20%.

However, recent years have seen a movement towards the complete abolishment of every type of freon from the standpoint of environmental protection. In air cryogenic separation plants, a method for directly cooling the feed air with a freon refrigerator or a method for cooling the feed air by means of circulating water in a spray cooling column may be used depending upon the size of the plant. However, even in the case of spray cooling columns, the circulating water may be cooled by a freon refrigerator, or the feed air may be further cooled by a freon refrigerator after the spray cooling column step; in either case, freon refrigerators are often used. Since the temperature of the feed air cannot be cooled to a pre-determined temperature if freon is not used, the problem of developing an adsorber wherein 40° C. air from the aftercooler of an air compressor is directly entered into the adsorber to remove water vapor and carbon dioxide has come to garner much interest.

At 620 kPa which is the normal adsorption pressure for pre-purification adsorbers, taking the saturated water vapor content in the air as an example, the saturated water vapor content when the air temperature is 40' C. is approximately 6 times that at 10° C., as is apparent from FIG. 1 which shows the relationship between the air temperature and the saturated water vapor content. Additionally, increasing the introduced water vapor content affects the water adsorbent so that the adsorption heat generated due to water adsorption in the activated alumina layer increases, with the temperature exceeding 60° C. at the zeolite layer, as a result of which the temperature dependency causes the carbon dioxide gas adsorption rate of the zeolite to decrease to about a third as shown in FIG. 2. Consequently, the water vapor and carbon dioxide gas cannot be adsorption removed at an adsorption temperature of 40° C., unless 6 times more activated alumina and 3 times more zeolite are filled. This forces the adsorption column to be extremely large, thus largely influencing the initial cost.

On the other hand, the adsorbent cannot be regenerated unless a quantity of heat which satisfies constant heating conditions, including the purge gas heating temperature and the purge gas amount, is used. Because the quantity of heat required for regeneration is proportional to the increase in the amount of adsorbent as is apparent from the heat capacity when there is 6 times the amount of activated alumina and 3 times the amount of zeolite, the regeneration heat quantity must be increased by increasing the amount of purge gas, increasing the heating temperature, or both. If an adsorbent is to be heated to 150° C. under conventional regeneration conditions, the purge gas proportion will exceed 100%, so as to make the product completely uncontrollable. Not only does this waste the feature of the TSA method wherein regeneration is able to be performed with a small amount of purge gas, but the very purpose of the adsorber for a pre-purification of an air cryogenic separation plant is also lost.

Additionally, even if the purge gas proportion is made somewhat lower by raising the purge gas heating temperature to 300° C., for example, the amount of product obtained is not very significant. Moreover, the capacity of the purge gas heater must be raised extensively and the heat-resistance temperature of the automatic valve seal in the portion where the heated purge gas flows must be changed from the conventional 250° C. heat resistance to a higher heat resistance, so that such wide-ranging replacements in terms of hardware become necessary, thereby heavily influencing the initial cost and the running cost. That is, adsorbers for high-air-temperature TSA method pre-purification designed according to conventional conditions are extremely uneconomical, and they are not able to be designed in actual practice.

Under conventional conditions, high-temperature air causes the amount of moisture entering the adsorption column to increase and the adsorption rate of the adsorbent to decrease; therefore, the amount of required adsorbent increases enormously and regeneration becomes difficult as explained above. The point is then to make the amount of filled adsorbent as small as possible without adding any special cooling equipment of dehumidifiers, since a freon refrigerator is not used.

As a method of reducing the amount of adsorbent, the superficial velocity can be slowed (that is, by enlargening the cross-sectional area of the adsorption column) to decrease the processing rate per unit of cross-sectional area within the adsorption column. The amount of adsorbent can be reduced because the processing time per unit adsorbent is lengthened by slowing the superficial velocity. However, this method requires the purge gas flow rate to be slowed in the regeneration step also, thus requiring more purge gas than conventional methods. Strictly speaking, this method merely lowers the fill layer height of the adsorbent without actually any difference in the fill amount of adsorbent, so that there is no significant reduction in the amount of adsorbent.

As another method of reducing the amount of adsorbent, the time duration of the adsorption step can be shortened in order to reduce the amount of impurities such as water vapor and carbon dioxide which enter the adsorber. However, the time periods allowed for heating and cooling in the regeneration step must then be necessarily shortened. Although the adsorbent is regenerated by means of heating the adsorbent in the TSA method, the rate at which the heat is transferred is restricted by the purge gas flow rate. That is, heat regeneration is not possible unless the heat is transferred while the heating temperature is made somewhat high. Consequently, the adsorbent cannot be regenerated within a standard time unless the heat transfer rate is made faster by increasing the purge gas to make up for the shortened regeneration time, and a heating temperature sufficient to desorb the adsorbed impurities such as water vapor and carbon dioxide is maintained. In other words, with an apparatus that is able to attain a purge gas rate which allows the heat transfer rate to be sufficiently fast, adsorbents can be regenerated if the pre-determined regeneration heat quantity conditions are met even when the heating temperature is lowered.

As another method of reducing the amount of adsorbent, an adsorbent with a large adsorption capacity can be selected. If the adsorption capacity per unit weight of an adsorbent is larger then the adsorbent is effective in removing a constant amount of impurities such as water vapor and carbon dioxide. For example, about 20% of the adsorbent can be eliminated due to the adsorption equilibrium relationship if an adsorbent having a 20% larger adsorption capacity than conventional adsorbents is used.

SUMMARY OF THE INVENTION

In consideration of the above, the present invention has the object of offering a method and apparatus for pre-purification air cryogenic separation plant which is operable at high temperatures and removes water vapor and carbon dioxide by directly introducing high-air-temperature pressurized feed air, released from an air- or water-cooling aftercooler of an air compressor, into an adsorber of a pre-purification apparatus, without providing any special equipment such as pre-cooling equipment or a dehumidifier to replace a freon refrigerator or a spray cooling column. A further object of the present invention is to offer a method and apparatus for pre-purification for air cryogenic separation plants wherein only the saturation water vapor content is removed from feed air released from a conventional spray cooling column, and the air is able to be introduced into an adsorption column without cooling by means of a cooling medium from a refrigerator.

In order to achieve that above-mentioned objectives, the present invention offers a pre-purification method for an air cryogenic separation plant which continuously purifies feed air by being provided with a plurality of reciprocally-used adsorption columns filled with adsorbents for adsorbing impurities such as water vapor and carbon dioxide from said feed air; said pre-purification method for an air cryogenic separation plant comprising: a) an adsorption step wherein pressurized feed air is fed into an adsorption column and impurities are removed from said feed air; b) a depressurization step wherein the pressure inside said adsorption column is reduced to approximately atmospheric pressure; c) a heating step wherein purge gas which does not contain impurities is fed into said adsorption column in order to heat-regenerate said adsorbent; d) a cooling step wherein the inside of said adsorption column is cooled to an adsorption operation temperature by means of said purge gas; and e) a repressurization step wherein the adsorption column is repressurized; wherein said adsorption step is performed by feeding pressurized feed air at a temperature of 10°~45° C. and a superficial velocity of 5~40 cm/s into said adsorption column which has been filled with water adsorbent and carbon dioxide adsorbent arranged so that said water adsorbent is closer to an air entry side of said adsorption column.

According to another aspect of the present invention, the heating step is performed at a heating temperature within the range of 100°~250° C., and the purge gas proportion of said purge gas is within the range of 20~60%.

According to another aspect of the present invention, the adsorption columns are provided in a dual-column switching system and the duration of a switching period consisting of said adsorption step a) and the regeneration steps b)~e) is within the range of 2~8 hours.

According to another aspect of the present invention, the adsorption columns are provided in a three-column switching system and the duration of a switching period consisting of said adsorption step a) and the regeneration steps b)~e) is within the range of 2~12 hours.

According to another aspect of the present invention, the feed air is fed into said plurality of adsorption columns after being pressurized by means of an air compressor and is cooled by means of an air- or water-cooled aftercooler.

According to another aspect of the present invention, the feed air is fed into said plurality of adsorption columns after being pressurized by means of an air compressor and is cooled by means of a water spray cooling column.

According to another aspect of the present invention, a pre-purification apparatus for an air cryogenic separation plant continuously purifies feed air by being provided with a plurality of reciprocally-used adsorption columns filled with adsorbents for adsorbing impurities such as water vapor and carbon dioxide from said feed air; said pre-purification apparatus for an air cryogenic separation plant performing a process comprising steps of: (a) an adsorption step wherein pressurized feed air is fed into an adsorption column and impurities are removed from said feed air at a temperature within the range of 20°~80° C.; (b) a depressurization step wherein the pressure inside said adsorption column is reduced to approximately atmospheric pressure; c) a heating step wherein purge gas which does not contain impurities is fed into said adsorption column in order to heat-regenerate said adsorbent; d) a cooling step wherein the inside of said adsorption column is cooled to an adsorption operation temperature by means of said purge gas; and e) a repressurization step wherein the adsorption column is repressurized; wherein said adsorption column is filled with water adsorbent and carbon dioxide adsorbent arranged so that said water adsorbent is closer to an air entry side of said adsorption column, and the weight ratio of said water adsorbent with respect to all of the adsorbents is within the range of 0.4~0.7.

According to another aspect of the present invention, the water adsorbent is at least one selected from the group consisting of activated alumina, silica gel, A-type zeolite and mixed adsorbents thereof.

According to another aspect of the present invention, the carbon dioxide adsorbent is a zeolite, preferably an X-type zeolite.

According to another aspect of the present invention, the zeolite is one selected from the group consisting of Na—X type zeolite, Ca—X type zeolite, Ba—X type zeolite and Ca—A type zeolite.

According to another aspect of the present invention, the water isothermal adsorption capacity of said water adsorbent is at least 10 mol/kg at a feed air temperature of 25° C. and the water saturation pressure.

According to another aspect of the present invention, the carbon dioxide isothermal adsorption capacity of said carbon dioxide adsorbent at a feed air temperature of 45° C. is at least 0.1 mol/kg at a carbon dioxide partial pressure of 0.1 kPa and at least 0.6 mol/kg at a carbon dioxide partial pressure of 1.0 kPa.

According to another aspect of the present invention, the carbon dioxide isothermal adsorption capacity of said carbon dioxide adsorbent at a feed air temperature of 25° C. is at least 0.3 mol/kg at a carbon dioxide partial pressure of 0.1 kPa and at least 1.5 mol/kg at a carbon dioxide partial pressure of 1.0 kPa.

According to another aspect of the present invention, the carbon dioxide isothermal adsorption capacity of said carbon dioxide adsorbent at a feed air temperature of less than 25° C. and within a carbon dioxide partial pressure range of 0.1~1.0 kPa is at least 0.3 mol/kg at a carbon dioxide partial pressure of 0.1 kPa and at least 1.5 mol/kg at a carbon dioxide partial pressure of 1.0 kPa.

According to another aspect of the present invention, the carbon dioxide isobaric adsorption capacity of said carbon dioxide adsorbent at a carbon dioxide partial pressure of 0.1 kPa is at least 0.3 mol/kg at a feed air temperature of 25° C. and at least 0.1 mol/kg at a feed air temperature of 45° C.

According to another aspect of the present invention, the carbon dioxide isobaric adsorption capacity of said carbon dioxide adsorbent at a carbon dioxide partial pressure of 1.0 kPa is at least 1.5 mol/kg at a feed air temperature of 25° C. and at least 0.6 mol/kg at a feed air temperature of 45° C.

Another aspect of the present invention comprises an air- or water-cooled aftercooler for cooling said feed air pressurized by said air compressor, and pipes for directly leading the cooled air to said plurality of adsorption columns.

Another aspect of the present invention comprises a water spray cooling column for cooling said feed air pressurized by said air compressor, and pipes for directly leading the cooled air to said plurality of adsorption columns.

In this way, the present invention allows the design of TSA method pre-purification adsorbers which are of significant industrial value even under high air temperature conditions such as at 10°~45° C. and especially at 25°~45° C., allowing the fulfillment of economical conditions, such as by holding down the amount of heat required for regeneration of adsorbent by optimizing the relationship between the purge gas ratio and the amount of regeneration heat determined by the heating temperature, by selecting highly efficient adsorbents as well as optimizing the relationship between the proportional amount of adsorbent, the superficial velocity and the purge gas flow rate, by allowing miniaturization of adsorbers due to reduction of switching times and adjustment of the time schedules, and by using adsorption columns filled with carbon dioxide adsorbents such as X-type zeolite and water adsorbents such as activated alumina for purification of air such that the water vapor and carbon dioxide content are reduced to desired levels.

As adsorbents for removal of water vapor and carbon dioxide, the adsorbers of the pre-purification apparatus for an air cryogenic separation plant according to the present invention use activated alumina or the like having an isothermal adsorption capacity for water of at least 10 mol/kg (at a feed air temperature of 25° C. and the saturation vapor pressure) as the water adsorbent, and an X-type zeolite having an isothermal adsorption capacity for carbon dioxide of 0.1~0.6 mol/kg (at a feed air temperature of 45° C. and a carbon dioxide partial pressure of 0.1~1.0 kPa) or an isobaric adsorption capacity for carbon dioxide of 0.1~0.3 mol/kg (at a feed air temperature of 25°~45° C. and a carbon dioxide partial pressure of 0.1 kPa), the adsorbents being filled in the above-given order from the air entrance side. Since the weight ratio of the activated alumina with respect to the entire amount of adsorbent is 0.4~0.7 as a result of the optimal adjustment of the filled proportion of activated alumina and X-type zeolite, impurities such as water vapor and carbon dioxide are able to be efficiently removed so as to allow the production of air with extremely minute concentrations of impurities such as water vapor and carbon dioxide, from feed air having a temperature of 10°~45° C., especially 25°~45° C. Additionally, special installations such as pre-cooling equipment or demoisturizers for the feed air are not required in order to replace freon refrigerators or water spray cooling columns, and high-temperature pressurized feed air released from an air- or water-cooled aftercooler of an air compressor is able to be fed directly into the adsorbers of the pre-purification apparatus. Furthermore, the air which is released for subsequent adsorption purification steps is cooled only by means of a water spray cooling column, without using a freon refrigerator. Moreover, the adsorbers of the pre-purification apparatus for an air cryogenic separation plant according to the present invention have a superficial velocity of 5~40 cm/s during the adsorption step, a purge gas proportion of 20~60% during the regeneration step, and a heat regeneration temperature of 100°~250° C., so as to allow for miniaturization of the adsorbers and to hold down the amount of heat required for regeneration of the adsorbents.

PREFERRED EMBODIMENTS OF THE INVENTION

Figure 1:
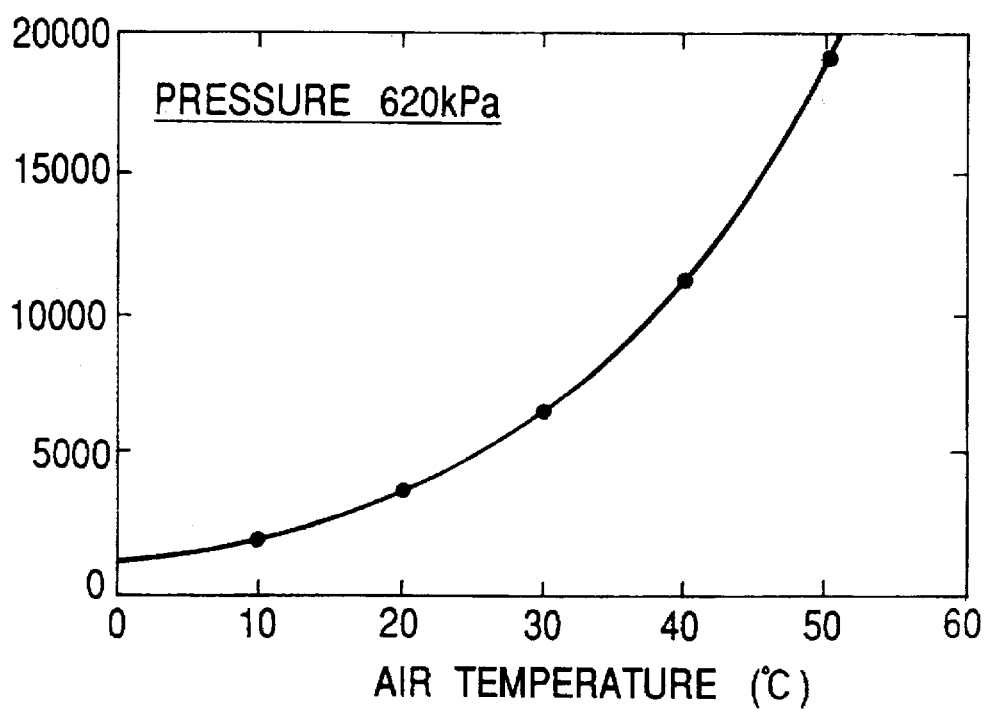
FIG. 1 is a graph showing the relationship between air temperature and saturated water vapor content.
Figure 2:
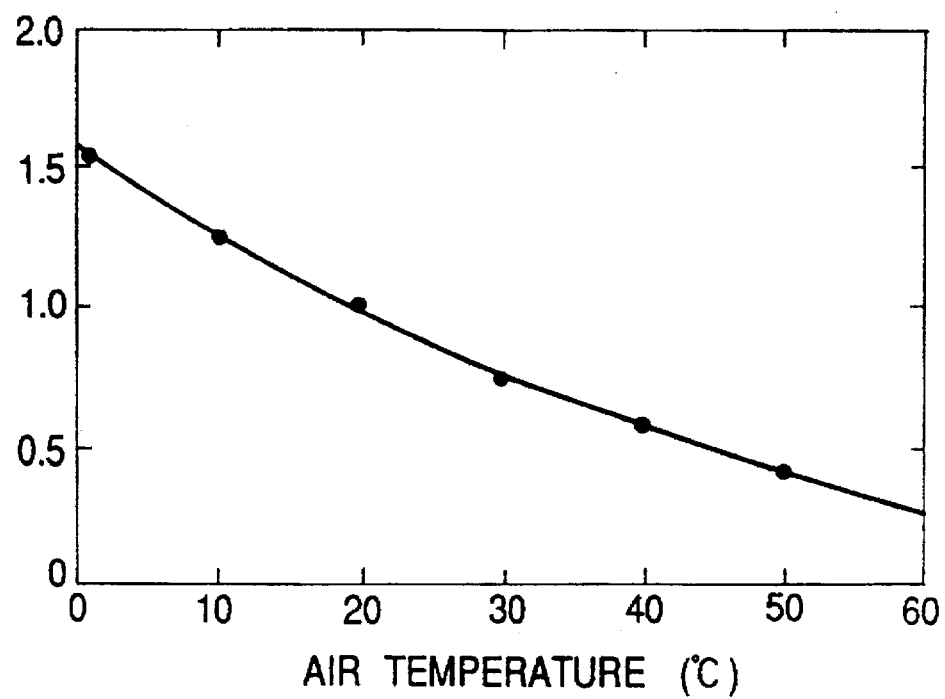
FIG. 2 is a graph showing the temperature dependence of the carbon dioxide adsorption content of zeolite.
Figure 3:
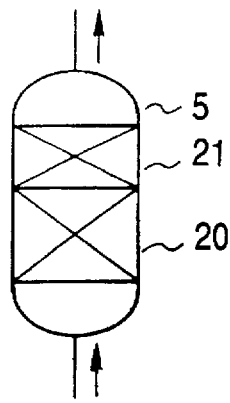
FIG. 3 is a section view of an adsorption column according to the first embodiment of the present invention.
Figure 4:
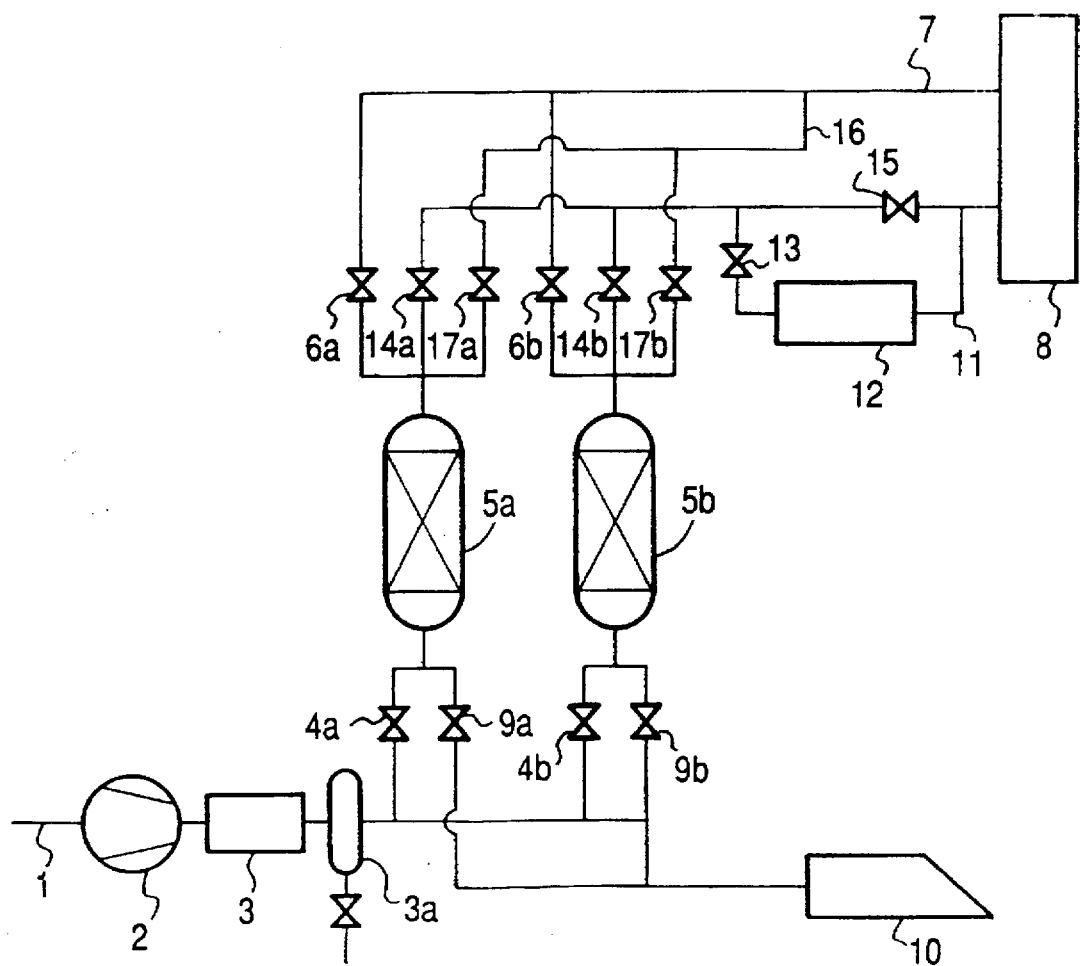
FIG. 4 is a diagram showing the system structure according to the first embodiment of the present invention.

The present invention will be explained in detail below. While the present embodiment has a dual column switch structure using a pair of adsorption columns, the present invention may use two or more adsorption columns which operate out of phase, or may use multiple pairs of adsorption columns. The present embodiment will be explained with reference to FIGS. 3 and 4. FIG. 4 is a diagram showing the flow system of a pre-purification apparatus for air cryogenic separation plant according to an embodiment of the present invention. FIG. 3 is a section view of an adsorption column used in the above-mentioned pre-purification apparatus, the adsorption column 5 corresponding to each of the pair of adsorption columns 5a and 5b of FIG. 4.

With reference to FIG. 4, feed air fed from a pipe 1 is compressed to the drive pressure by an air compressor 2, then enters an aftercooler 3. Here, the air is cooled to less than at least approximately 40' C. through a heat transfer with coolant water, and the condensed water is drained away by the drain separator 3a. After exiting the aftercooler, the pressurized feed air which is water-saturated at 40' C. is reciprocally sent to an adsorption column 5a by opening a valve 4a and an adsorption column 5b by opening a valve 4b. The adsorption columns 5a and 5b operate out of phase with each other so that while one is undergoing an adsorption step for purifying the air, the other is undergoing a regeneration step.

During the adsorption step of the adsorption column 5a, valve 4a is opened, valves 4b and 9a are closed, and the pressurized feed air is fed into adsorption column 5a. Water adsorbent 20a and carbon dioxide adsorbent 21a which have been loaded into adsorption column 5a remove moisture and carbon dioxide. Then, valves 6b, 14a, 17a and 17b are closed while valve 6a is opened so that practically purified air flows into a coldbox 8 via a pipe 7. The adsorption step ends before the forward end of the impurities break through the adsorbent layer. In other words, the adsorption column 5a is loaded with enough adsorbent to remove water vapor and carbon dioxide down to concentrations of 1 ppm and 0.1 ppm respectively within the time pre-set for the adsorption step. This suitable amount of adsorbent is determined experimentally.

After the above-mentioned adsorption step (a) of the adsorption column 5a has been completed, valves 4a and 6a are closed and valve 9a is opened so that the adsorption column 5a is depressurized to atmospheric pressure through communication with the silencer 10. After completion of this depressurization step (b), valves 13 and '4a are opened so that purge gas fed back from the coldbox 8 flows through the pipe 11, is heated to a pre-determined temperature by means of a heater 12 and is fed into the adsorption column 5a in the direction opposite to the air flow during the adsorption step, thereby heat regenerating the carbon dioxide adsorbent 21a and the water adsorbent 20a within the adsorption column 5a. After the above-mentioned heating step (c), valve 13 is closed and valve 15 is opened in order to cool the adsorption column 5a.

After the above-mentioned cooling step (d) has been completed, valves 9a, 14a and 15 are closed and valve 17a is opened so that a portion of the purified air is returned through the pipe 16 to repressurize the adsorption column 5a. When the adsorption column 5a reaches a pre-determined pressure, the repressurization step (e) of the adsorption column 5a is completed, thereby ending the regeneration steps (b)–(e) of the adsorption column 5a. Then, valve 17a is closed and valves 4a and 6a are reopened to start a new cycle of the adsorption column 5a. An example of a typical cycle for the dual-column switching system wherein adsorption columns 5a and 5b are operated out of phase is shown in Table 1. As seen in Table 1, the period of a single switching cycle of the adsorption step (a) and the regeneration steps (b)–(e) is 4 hours. Additionally, Table 1 shows that the adsorption columns 5a and 5b are operated out of phase so that one is undergoing the adsorption step for purifying air while the other is undergoing the regeneration steps.

TABLE 1

| ADSORPTION COLUMN 5a | TIME (min) | OPENED VALVES | ADSORPTION COLUMN 5b |
|---|---|---|---|
| Adsorption | 120 | 4a, 6a | Regeneration |
| Depressurization | 3 | 9a | Adsorption |
| Heating | 55 | 9a, 13, 14a | Adsorption |
| Cooling | 50 | 9a, 14a, 15 | Adsorption |
| Repressurization | 12 | 17a | Adsorption |

With the embodiments of the present invention which use two types of adsorbents, i.e. water adsorbent and carbon dioxide adsorbent, the two types of adsorbent may be loaded in separate adsorption columns, or may be layered into a single adsorption column by providing a suitable partition between the two layers so as to prevent mixing. Preferably, they should be layered into a single adsorption column. The water adsorbent and the carbon dioxide adsorbent are respectively filled in order from the air entry port. Consequently, the water vapor, which has a high content, is removed from the pressurized feed air before the carbon dioxide, which has a low content, is removed.

The temperature distribution within the adsorption columns after the adsorption step has been initiated is influenced by the temperature distribution after the completion of the regeneration step, which depends on the ultimate temperature attained during cooling and the heat of adsorption which is mostly generated by nitrogen adsorption during repressurization. Once the feed air has been introduced, the adsorption column entrance temperature quickly reaches the feed air temperature, so that the temperature of the adsorbent layers becomes higher than the feed air temperature by an amount corresponding to the heat of adsorption of water vapor and carbon dioxide. After reaching saturation by adsorbing impurities, the temperature of the adsorbent layers gradually approaches the feed air temperature due to the lack of adsorption heat generation. The temperature of the adsorption column exit continually maintains a temperature higher than the feed air temperature by an amount corresponding to the heat of adsorption until the adsorption step has been completed. In this way, the temperature within the adsorption column continuously changes with the advancement of adsorption during the adsorption step. When considering the heat of adsorption for saturated water of an air temperature at feed air temperatures of 10°~45° C., especially 25°~45° C., in the present embodiment, the adsorption operation is performed at an adsorption column temperature of 20~80° C., more restrictively 30°~70° C., whereby impurities such as water vapor and carbon dioxide are removed from the feed air by means of the above-mentioned adsorbents. After the regeneration steps, there are cases wherein the temperature around the column entrance rises to about 90° C. during initiation of the adsorption step depending on the temperature distribution within the column.

Additionally, the high-temperature pressurized feed air released from the aftercooler of an air compressor, which is water-cooled or air-cooled, is directly led to the adsorption column having a temperature of 25°~45° C. at the entry portion, and impurities such as water vapor and carbon dioxide are removed by means of the above-mentioned adsorbents. Furthermore, pressurized feed air cooled only by means of a water spray cooling column to water temperature is also directly entered into the adsorption column. In the above-given embodiment, there are no hydrogen or carbon monoxide removal steps using a catalytic reaction between the two steps; if such hydrogen or carbon monoxide removal steps are to be provided, then of course the above-mentioned pressurized feed air is not directly introduced into the adsorption column but is instead led to the adsorption column after a catalysis step.

As a heat insulation method for the adsorption column and the purge gas flow system, either an external insulation system wherein insulator is provided around the outer circumferences of the adsorption column and the pipes, or an internal insulation system wherein insulator is provided around the inner circumferences of the adsorption columns may be used.

The adsorbents used in the present invention are water adsorbents such as activated alumina and carbon dioxide adsorbents such as X-type zeolite, which are selected from among commercially available adsorbents on the basis of performance evaluations. These adsorbents may be in the form of pellets, tablets or beads. As water adsorbents, silica gel or A-type zeolites such as 3A, 4A or 5A types can be used instead of activated alumina. These water adsorbents can also be mixed together. As carbon dioxide adsorbents, aside from X-type zeolites such as Na—X type zeolite, Ca—X type zeolite and Ba—X type zeolite and Ca—A type zeolite can be used, of which Na—X type zeolite is preferable.

Figure 5:
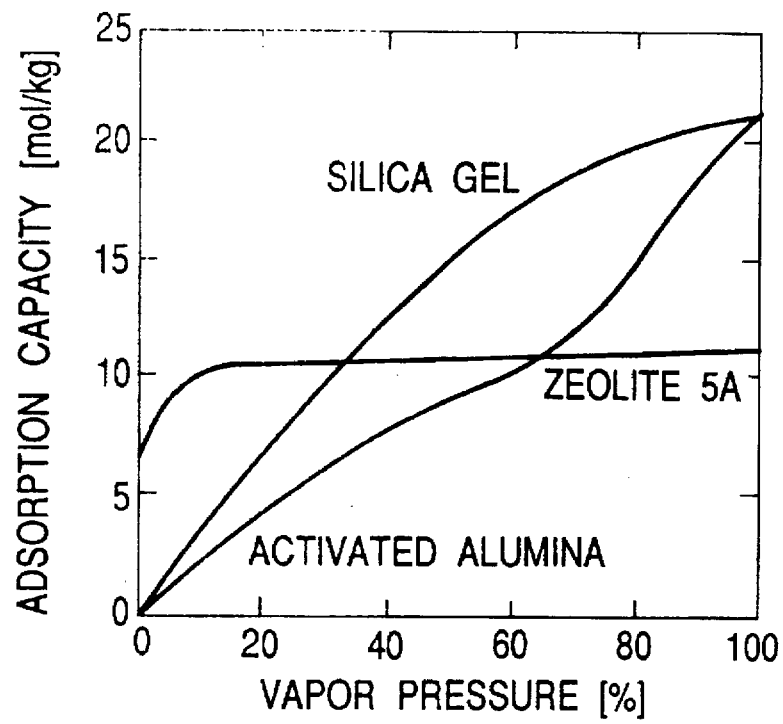
FIG. 5 is a graph showing the isotherms of a water adsorbent used in an embodiment of the present invention.

As seen in FIG. 5, the water isothermal adsorption capacity for the water adsorbent at a feed air temperature of 25° C. should be at least 10 mol/kg at the saturation vapor pressure, more preferably at least 20 mol/kg.

Figure 6:
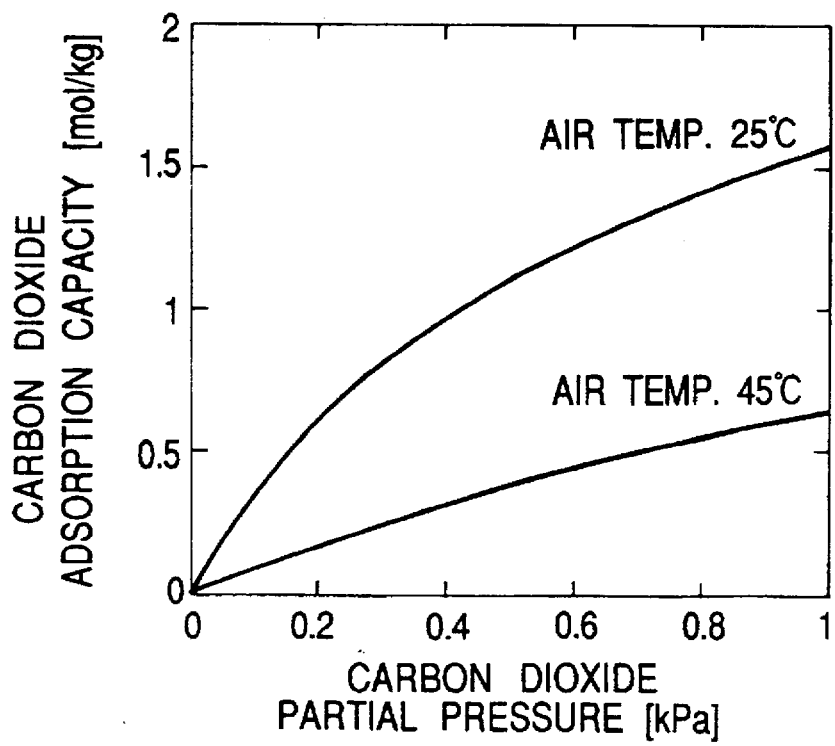
FIG. 6 is a graph showing the isotherms of a carbon dioxide adsorbent used in an embodiment of the present invention.

Additionally, as seen in FIG. 6, the carbon dioxide isothermal adsorption capacity for the carbon dioxide adsorbent at a feed air temperature of 45° C. should be at least 0.1 mol/kg at a carbon dioxide partial pressure of 0.1 kPa, gradually rising as the carbon dioxide partial pressure increases, and should preferably be at least 0.6 mol/kg at 1.0 kPa. At a feed air temperature of 25° C., the value should be at least 0.3 mol/kg at a carbon dioxide partial pressure of 0.1 kPa, gradually rising as the carbon dioxide partial pressure increases, and should preferably be at least 1.5 mol/kg at 1.0 kPa. Thus, when the carbon dioxide partial pressure is 0.1 kPa, the carbon dioxide isothermal adsorption capacity should preferably be at least 0.3 mol/kg at a feed air temperature of 25° C. and at least 0.1 mol/kg at a feed air temperature of 45° C. Additionally, when the carbon dioxide partial pressure is 1.0 kPa, the value should preferably be at least 1.5 mol/kg at a feed air temperature of 25° C. and at least 0.5 mol/kg at a feed air temperature of 45° C.

The present invention is explained in further detail below by way of a number of examples; however, the present invention is not necessarily limited by these examples.

EXAMPLES 1~14

The water vapor and carbon dioxide in hot air of 25°~45° C. were removed by using the apparatus of FIG. 4 and the cycles of Table 1. The adsorbents were obtained through the commercial market; the water adsorbent was in the form of activated alumina beads having particle sizes of approximately 3 mm, and the carbon dioxide adsorbent was in the form of $\frac{1}{16}$ inch sized X-type zeolite pellets. The adsorption was performed using water-saturated air (for the air temperature) containing 400 ppm of carbon dioxide, at a pressure of 620 kPa. During the adsorption step, a number of concentration analysis points were provided in the activated alumina and X-type zeolite layers. The distribution of the concentration was examined by using a dew-point hygrometer and a carbon dioxide concentration analyzer at each of these points in order to experimentally determine the required amount of water adsorbent in the form of activated alumina and carbon dioxide adsorbent in the form of zeolite needed to make the water vapor and carbon dioxide concentrations at the adsorption column exit port 1 ppm and 0.1 ppm respectively. These amounts are shown in Table 2.

Additionally, during the regeneration steps, the temperature change within the adsorption column was measured in order to confirm that the necessary heating conditions were being met and to determine the optimum regeneration conditions by adjusting the amount of purge gas, the heating temperature, and the time schedule for the heating period and the cooling period. The conditions for establishing a TSA cycle were that after the repetition of 10 cycles, (a) the breakthrough time does not vary over different cycles at the same concentration measurement point, (b) the temperature distribution within the adsorption column does not vary over different cycles, and (c) the impurity concentration at the adsorption column exit port is held below a required concentration. The purge gas used in the regeneration was nitrogen which did not contain water vapor and carbon dioxide. The results of the evaluation of the regeneration conditions for the purge gas ratio and heating temperature are shown together in Table 2.

TABLE 2

| EX. No. | AIR TEMP. (°C.) | SUPER-FICIAL VELOC-ITY (cm/s) | PURGE GAS RATIO (%) | HEAT-ING TEMP. (°C.) | HEIGHT OF ALL ADSOR-BENT LAYERS (mm) | RATIO OF ALUMINA AMONG ALL AD-SORBENTS |
|---|---|---|---|---|---|---|
| 1 | 25 | 16 | 25 | 150 | 660 | 0.46 |
| 2 | 25 | 16 | 30 | 130 | 660 | 0.46 |
| 3 | 30 | 17 | 25 | 175 | 790 | 0.50 |
| 4 | 30 | 17 | 35 | 130 | 790 | 0.50 |
| 5 | 35 | 18 | 30 | 175 | 1000 | 0.56 |
| 6 | 35 | 18 | 35 | 155 | 1000 | 0.56 |
| 7 | 40 | 19 | 30 | 200 | 1240 | 0.62 |
| 8 | 40 | 19 | 40 | 160 | 1240 | 0.62 |
| 9 | 45 | 19 | 40 | 225 | 1750 | 0.69 |

TABLE 2-continued

| EX. No. | AIR TEMP. (°C.) | SUPER- FICIAL VELOC- ITY (cm/s) | PURGE GAS RATIO (%) | HEAT- ING TEMP. (°C.) | HEIGHT OF ALL ADSOR- BENT LAYERS (mm) | RATIO OF ALUMINA AMONG ALL AD- SORBENTS |
|---|---|---|---|---|---|---|
| 10 | 45 | 19 | 50 | 185 | 1750 | 0.69 |
| 11 | 40 | 5 | 27 | 200 | 290 | 0.65 |
| 12 | 40 | 10 | 29 | 200 | 650 | 0.63 |
| 13 | 40 | 30 | 31 | 200 | 2040 | 0.59 |
| 14 | 40 | 38 | 34 | 200 | 2810 | 0.55 |

The superficial velocity must be controlled so that the adsorbent does not flow but the flow rate of the purge gas is allowed to be relatively fast. In the present examples, the superficial velocity was 5~40 cm/s as shown in Table 2. Preferably, it should be in the range of 10~20 cm/s. Most preferable is the range of 15~20 cm/s.

As is apparent from Table 2, the height of the adsorbent layers does not change as long as the air temperature and superficial velocity are constant, without any dependence on the regeneration conditions of purge gas ratio and heating temperature. Consequently, the adsorbent is efficiently regenerated when the amount of heat for regeneration fulfills standard heating conditions, and a constant effective adsorption rate is able to be maintained. Additionally, the ratio of the weight of the activated alumina with respect to the weight of all adsorbents (the total weight of water adsorbent and carbon dioxide adsorbent) increases as the air temperature rises, as seen in Table 2. This relationship is a result of the fact that the proportional increase in the required amount of activated alumina in response to an increase in the saturated water content is larger than the proportional increase in the required amount of zeolite in response to a zeolite adsorption rate decrease due to temperature dependency. Furthermore, within the normal range of adsorber working pressures, the optimum activated alumina weight ratio for the apparatus of the present invention is 0.4~0.7 as shown in Table 2, when considering that the amount of change in the saturated water content and the adsorption rate in response to pressure fluctuations is quantitatively determined through experimentation. With an air temperature range of 25°~35° C. as in Examples 1~6, the height of the adsorbents is two-thirds the conventional level, so that the adsorption column is able to be compactly designed. While the present examples have a two-hour switching cycle (the adsorption step is 2 hours long, the regeneration step is 2 hours long, and the switching period is 4 hours long), by changing this to a one-hour switching cycle (1 hour adsorption step, 1 hour regeneration step, and 2 hour switching period), the load on the adsorption side is halved and a miniaturization can be expected. On the other hand, if the conventional adsorption column is used with a four-hour switching cycle (4 hour adsorption step, 4 hour regeneration step, and 8 hour switching period), the time allotted for regeneration becomes longer, thereby allowing a reduction in the amount of purge gas or the heating temperature.

At an air temperature of 40' C. as in Examples 7 and 8, the height of the adsorbent layers is about 1240 mm, thus indicating that the size of the conventional adsorption column is sufficient. Additionally, due to the relationship between the purge gas ratio and the heating temperature, the heating temperature can be held to under 160° C. when the present process is used in a single distillation column air cryogenic separation plant which can hold the purge gas ratio above 40%. At an air temperature of 45° C. as in Examples 9 and 10, the height of the adsorbent layers was confirmed to be the conventional level of 1750 mm, but the purge gas ratio and the heating temperature were relatively high. When the air temperature exceeds 40° C., there is a tendency for the required amount of adsorbent to increase greatly with a rise in the saturated water content. When the air temperature exceeds 45° C., the size of the adsorption column cannot be maintained at conventional levels, and the amount of heat required for regeneration increases dramatically. Consequently, the air temperature should be less than 45° C. for the adsorber to be operated economically.

At superficial velocities of 5~40 cm/s as shown in Examples 11~14, the height of the adsorbent layers increases as the superficial velocity becomes faster as shown in Table 2. While this is due to the increase in the amount of feed air fed into the adsorption column in the two hours of the adsorption step which accompanies the increase in the superficial velocity, the length of the adsorption band (mass transfer zone) is also considered to be influenced by the superficial velocity. By changing the superficial velocity in this way, the length of the carbon dioxide band (mass transfer zone) of the zeolite layer largely changes, and the weight ratio of the activated alumina decreases overall as the superficial velocity becomes faster. Furthermore, with the regeneration conditions of purge gas ratio and heating temperature, the purge gas content was adjusted to the optimum value while the heating temperature was held constant, whereupon the purge gas ratio in the regeneration step tended to increase since a greater amount of adsorbent was required due to the length of the carbon dioxide adsorption band (mass transfer zone) increasing as the superficial velocity increased.

This relationship between the superficial velocity and the adsorption band length indicates that if the superficial velocity is too fast, the adsorbent cannot be used effectively. Additionally, the superficial velocity should preferably not be larger than necessary so as not to allow the adsorbent to fluidize. Conversely, the superficial velocity should not be made too slow, since the purge gas flow speed should preferably not be too slow. Thus, the superficial velocity must be faster than a certain value so as to minimize the heat loss during heat regeneration and to allow efficient heat movement. That is, the operative range of superficial velocities in the embodiments of the present invention should be 5~40 cm/s, more preferably 10~20 cm/s, and most desirably 15~20 cm/s.

In this way, there is considerable allowance in the height of the adsorbent layers in an air temperature range of 25°~40° C. as in Examples 1~8 and the range of superficial velocities in Examples 11 and 12, so that the initial costs can be lowered by designing the adsorption columns to be smaller, or the running costs can be lowered by further reducing the heating temperature or the amount of purge gas by extending the switching time while maintaining the conventional adsorption column size. In this case, the switching time for the dual-column switching system should preferably be 1~4 hours (the switching period of the adsorption step and the regeneration step should be 2~8 hours).

Additionally, with the air temperature range of 25°~40° C. as in Examples 1~8 and the range of superficial velocities in Examples 11 and 12, when using a three-column switching system wherein the cycles are performed by offsetting the phases of the adsorption, regeneration and repressurization steps, the switching time should preferably be 1~4 hours (the switching period of the adsorption step, the regeneration step and the repressurization step should be 3~12 hours).

On the other hand, at an air temperature range of 40°~45° C. as in Examples 9, 10, 13 and 14 and an superficial velocity in the range of 19~38 cm/s, a miniaturization of the adsorption column is made possible by using a three-column switching system and shortening the switching time to about 40 minutes. In this case, the amount of adsorbent loaded into each column is largely reduced, and the heating temperature or the purge gas ratio can thereby be decreased. Since the repressurization step may be made long in the three-column system, the pressure fluctuations on the coldbox side can be reduced. Additionally, it is effective for use with oscillatory motion compressors which have constant feed air exhaust rates. In this air temperature range, the switching time should preferably be 40 minutes~2 hours (the switching period of the adsorption step, the regeneration step and the repressurization step should be 2~6 hours).

Of course, when the air temperature is less than 25° C. or the adsorption pressure is greater than the 620 kPa which was the experimental condition, the adsorption conditions further improve, thereby increasing the adsorber performance. For example, when the feed air temperature is 10°~25° C., the saturated water vapor content further decreases from the above-mentioned case for 25° C., so that the adsorption rate of water adsorbent and carbon dioxide adsorbent is greater than that for 25° C., and the operative conditions further improve from the cases shown in Table 2. That is, the operative conditions become even more flexible if the superficial velocity and the switching time are the same.

Additionally, while an example of the relationship between the purge gas ratio and the heating temperature was shown in Table 2 under consideration of economization of the regeneration conditions, the process of the present invention can of course be established in apparatus which are able to maintain greater amounts of regeneration heat.

In this way, the present invention allows the optimum process and switching time to be selected without enlargening the size of the adsorber (miniaturization is possible in some cases), so that the value of elements which contribute to the cost can be held to a minimum.

Figure 7:
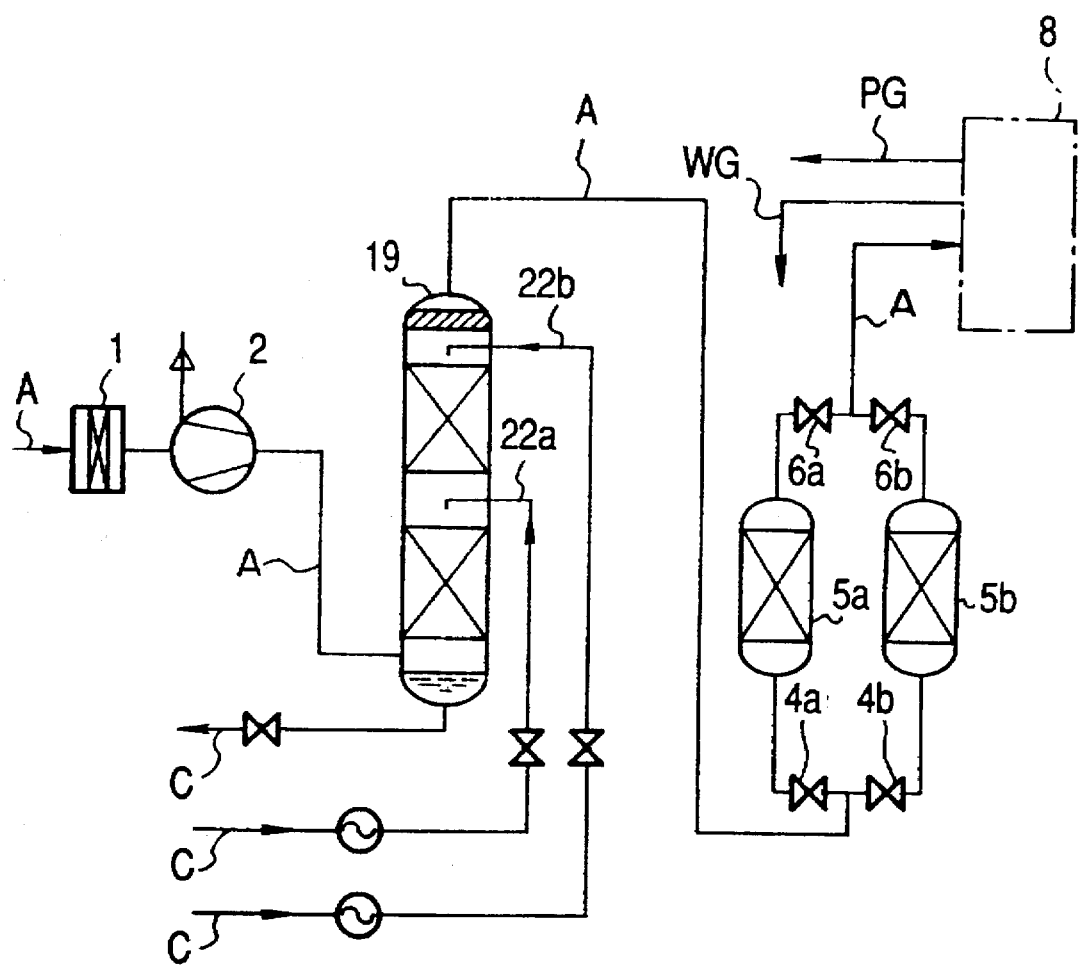
FIG. 7 is a diagram showing the system structure according to another embodiment of the present invention.

FIG. 7 shows a flow diagram for Example 15. In this example, pressurized feed air which has left the feed air compressor 2 is fed into the water spray cooling column 20 and cooled to approximately the same temperature as the coolant water temperature or slightly higher, then fed to the adsorption columns 5a, 5b. The coolant water fed to the water spray cooling column 20 may use industrial water cooled by a normal cooling tower and supplied to both coolant water feed routes 22a, 22b, or the coolant water fed through the route 22b which supplies the top portion of the water spray cooling column 20 may be coolant water which has been cooled by means of exhaust gas WG from the coldbox 30 in a water cooling column by evaporation (not shown).

We claim:

1. A pre-purification method for an air cryogenic separation plant which continuously purifies feed air by being provided with a plurality of reciprocally-used adsorption columns filled with adsorbents for adsorbing impurities such as water vapor and carbon dioxide from said feed air; said pre-purification method for an air cryogenic separation plant comprising:

a) an adsorption step wherein pressurized feed air is fed into an adsorption column and impurities are removed from said feed air;

b) a depressurization step wherein the pressure inside said adsorption column is reduced to approximately atmospheric pressure;

c) a heating step wherein purge gas which does not contain impurities is fed into said adsorption column in order to heat-regenerate said adsorbent, wherein said heating is performed at a heating temperature within the range of 100°~250° C., and the purge gas ratio of said purge gas to said feed air is within a range of 20~60%;

d) a cooling step wherein the inside of said adsorption column is cooled to an adsorption operation tempaerature by means of said purge gas; and e) a repressurization step wherein the adsorption column is repressurized;

wherein said adsorption step is performed by feeding pressurized feed air at a temperature of 10°~45° C. and a superficial velocity of 5~40 cm/s into said adsorption column which has been filled with water adsorbent and carbon dioxide adsorbent arranged so that said water adsorbent is closer to an air entry side of said adsorption column.

2. A pre-purification method for an air cryogenic separation plant according to claim 1, wherein said adsorption columns are provided in a dual-column switching system and the duration of a switching period consisting of said adsorption step a) and the regeneration steps b)~e) is within the range of 2~8 hours.

3. A pre-purification method for an air cryogenic separation plant according to claim 1, wherein said adsorption columns are provided in a three-column switching system and the duration of a switching period consisting of said adsorption step a) and the regeneration steps b)~e) is within the range of 2~12 hours.

4. A pre-purification method for an air cryogenic separation plant according to claim 1, wherein said feed air is fed into said plurality of adsorption columns after being pressurized by means of an air compressor and is cooled by means of an air- or water-cooled aftercooler.

5. A pre-purification method for an air cryogenic separation plant according to claim 1, wherein said feed air is fed into said plurality of adsorption columns after being pressurized by means of an air compressor and is cooled by means of a water spray cooling column.

6. A pre-purification apparatus for an air cryogenic separation plant which continuously purifies feed air by being provided with a plurality of reciprocally-used adsorption columns filled with adsorbents for adsorbing impurities such as water vapor and carbon dioxide from said feed air; said pre-purification method for an air cryogenic separation plant comprising:

a) an adsorption step wherein pressurized feed air is fed into an adsorption column and impurities are removed from said feed air at a temperature within the range of 20°~80° C.;

b) a depressurization step wherein the pressure inside said adsorption column is reduced to approximately atmospheric pressure;

c) a heating step wherein purge gas which does not contain impurities is fed into said adsorption column in order to heat-regenerate said adsorbent;

d) a cooling step wherein the inside of said adsorption column is cooled to an adsorption operation tempaerature by means of said purge gas; and e) a repressurization step wherein the adsorption column is repressurized;

wherein said adsorption column is loaded with water adsorbent and carbon dioxide adsorbent arranged so that said water adsorbent is closer to an air entry side of said adsorption column, and the weight ratio of said water adsorbent with respect to all of the adsorbents is within the range of 0.4~0.7 and wherein said plurality of adsorption columns are provided in a switching system means having a duration of a switching period consisting of said adsorption step a) and the regeneration steps b)~e) within a range of 2~12 hours.

7. A pre-purification apparatus for an air cryogenic separation plant according to claim 6, wherein said water adsorbent is at least one selected from the group consisting of activated alumina, silica gel, A-type zeolite and mixed adsorbents thereof.

8. A pre-purification apparatus for an air cryogenic separation plant according to claim 6, wherein said carbon dioxide adsorbent is a zeolite, preferably an X-type zeolite.

9. A pre-purification apparatus for an air cryogenic separation plant according to claim 6, wherein the water isothermal adsorption capacity of said water adsorbent is at least 10 mol/kg at a feed air temperature of 25° C. and the saturated water vapor pressure.

10. A pre-purification apparatus for an air cryogenic separation plant according to claim 6, wherein the carbon dioxide isothermal adsorption capacity of said carbon dioxide adsorbent at a feed air temperature of 45° C. is at least 0.1 mol/kg at a carbon dioxide partial pressure of 0.1 kPa and at least 0.6 mol/kg at a carbon dioxide partial pressure of 1.0 kPa.

11. A pre-purification apparatus for an air cryogenic separation plant according to claim 6, wherein the carbon dioxide isothermal adsorption capacity of said carbon dioxide adsorbent at a feed air temperature of 25° C. is at least 0.3 mol/kg at a carbon dioxide partial pressure of 0.1 kPa and at least 1.5 mol/kg at a carbon dioxide partial pressure of 1.0 kPa.

12. A pre-purification apparatus for an air cryogenic separation plant according to claim 6, wherein the carbon dioxide isothermal adsorption capacity of said carbon dioxide adsorbent at a feed air temperature of less than 25° C. and within a carbon dioxide partial pressure range of 0.1~1.0 kPa is at least 0.3 mol/kg at a carbon dioxide partial pressure of 0.1 kPa and at least 1.5 mol/kg at a carbon dioxide partial pressure of 1.0 kPa.

13. A pre-purification apparatus for an air cryogenic separation plant according to claim 6, wherein the carbon dioxide isobaric adsorption capacity of said carbon dioxide adsorbent at a carbon dioxide partial pressure of 0.1 kPa is at least 0.3 mol/kg at a feed air temperature of 25° C. and at least 0.1 mol/kg at a feed air temperature of 45° C.

14. A pre-purification apparatus for an air cryogenic separation plant according to claim 6, wherein the carbon dioxide isobaric adsorption capacity of said carbon dioxide adsorbent at a carbon dioxide partial pressure of 1.0 kPa is at least 1.5 mol/kg at a feed air temperature of 25° C. and at least 0.6 mol/kg at a feed air temperature of 45° C.

15. A pre-purification apparatus for an air cryogenic separation plant according to claim 6, comprising an air-or water-cooled aftercooler for cooling said feed air pressurized by said air compressor, and pipes for directly leading the cooled air to said plurality of adsorption columns.

16. A pre-purification apparatus for an air cryogenic separation plant according to claim 6, comprising a water spray cooling column for cooling said feed air pressurized by said air compressor, and pipes for directly leading the cooled air to said plurality of adsorption columns.

* * * * *